United States Patent [19]

Graviss et al.

[11] Patent Number: 5,303,451
[45] Date of Patent: Apr. 19, 1994

[54] THERMOPLASTIC AND LOW MODULUS THERMOPLASTICS FOR APPLIANCE HANDLES

[75] Inventors: Kenton J. Graviss; James H. Harding; Scott A. Calvert; Frank S. Pang, all of Louisville, Ky.

[73] Assignee: General Electric Company, Louisville, Ky.

[21] Appl. No.: 952,972

[22] Filed: Sep. 29, 1992

[51] Int. Cl.[5] ............................................. A47B 95/02
[52] U.S. Cl. ....................................... 16/125; 16/119
[58] Field of Search ...................... 16/125, 127, 116 R, 16/110 R, 111 R, 114 R, DIG. 24, DIG. 25, DIG. 28, 126, 119; 296/71; 49/460

[56] References Cited

U.S. PATENT DOCUMENTS

| | | | |
|---|---|---|---|
| 2,987,149 | 6/1961 | Finkelstein | 16/126 |
| 3,183,549 | 5/1965 | Hammesfahr | 16/125 |
| 3,813,729 | 6/1974 | Szabo et al. | 16/119 |
| 3,995,349 | 12/1976 | Roberts et al. | 16/125 |
| 4,021,072 | 5/1977 | Belanger | 296/71 |
| 4,047,263 | 9/1977 | Tietze | 16/125 |
| 4,340,990 | 7/1982 | Seynhaeve | 16/126 |
| 4,745,656 | 5/1988 | Revelett | 16/125 |
| 4,794,668 | 1/1989 | Lorence et al. | 16/125 |
| 4,912,808 | 4/1990 | Blakely | 16/125 |

Primary Examiner—Paula A. Bradley
Assistant Examiner—Chuck Y. Mah
Attorney, Agent, or Firm—H. Neil Houser

[57] ABSTRACT

A handle assembly for use with doors of household refrigerators includes an elongated stiffener member in the shape of a channel having a base and projecting sides. A number of apertures are spaced along the base. Each end of the member is formed with offset portions. A body of thermoplastic elastomer having a Shore A Durometer hardness of no more than about 50 is injection molded about the stiffener member. The elastomer fills the apertures and surrounds the offset portions.

4 Claims, 1 Drawing Sheet

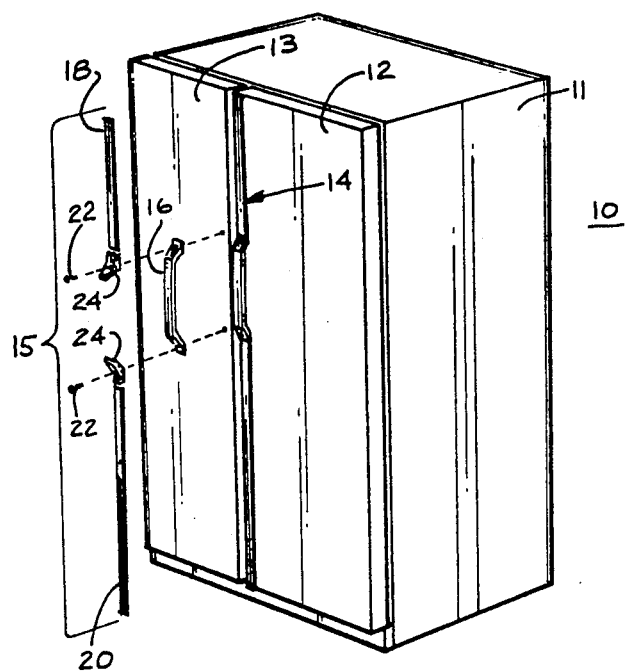
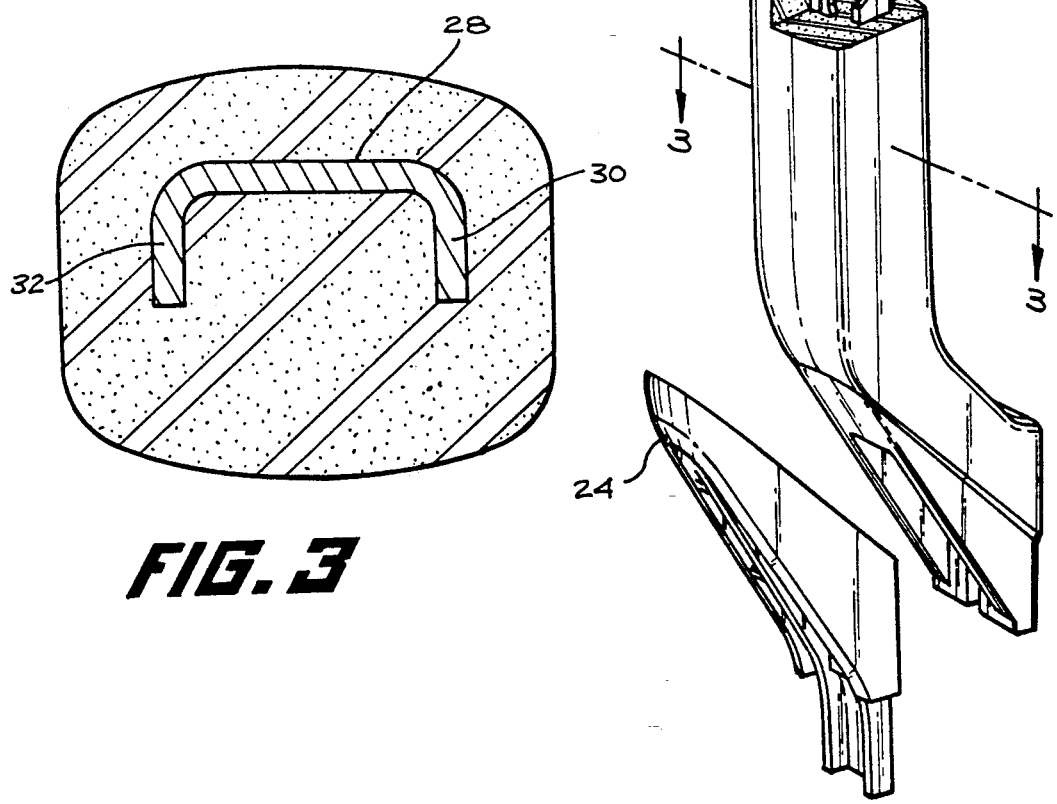

THERMOPLASTIC AND LOW MODULUS THERMOPLASTICS FOR APPLIANCE HANDLES

BACKGROUND OF THE INVENTION

Many consumers prefer that the handles of household refrigerators have a soft feel or touch. For years this was accomplished, at least to some degree, by use of multi-component assemblies including inserts which were soft to the touch which were assembled using screws or other fasteners.

A few years ago refrigerator handles were introduced which had a metallic stiffener surrounded by a body of urethane. More specifically the stiffener was over-molded with a two component reactive urethane formulation with an in-mold aliphatic urethane coating. The in-mold coating was used to cover the porosity of the molded urethane, to provide ultra violet protection to the urethane and to enhance the appearance of the handle. This required a relatively complicated molding process, using multiple materials and the handles were not uniformly "soft". For example the underside of such handles normally are not as thick as the top or front. Such relatively thin undersides tended to feel harder.

It is an object of the present invention to provide an improved handle assembly for household refrigerators.

It is another object of the present invention to provide such an improved handle assembly which provides a "soft" feel to the user.

It is still another object to provide such an improved "soft" feel handle assembly which is simple in construction and flexible in application.

SUMMARY OF THE INVENTION

In accordance with one embodiment of the invention a door handle assembly includes an elongated metal stiffener member in the shape of a channel with a base and projecting sides. A body of thermoplastic elastomer is injection molded around the stiffener member and means is included to interlock the body of elastomer to the stiffener. In one form of the invention the stiffener is formed with apertures in the channel base and with offset portions at each end. The elastomer extends through the apertures and surrounds the offset portions. In a preferred embodiment the elastomer has a Shore A Durometer hardness of no more than about 50.

BRIEF DESCRIPTION OF THE DRAWINGS

FIG. 1 is a simplified perspective view of a refrigerator with a handle incorporating one form of the present invention;

FIG. 2 is a perspective view of the handle of FIG. 1, the view being partly broken away and partially in section; and FIG. 3 is a cross sectional view generally as seen along line 3—3 in FIG. 2.

DESCRIPTION OF THE PREFERRED EMBODIMENTS

Referring to FIG..1, there is shown a household refrigerator 10 of the side-by-side refrigerator/freezer type. The refrigerator 10 includes an outer cabinet 11 which is divided into a fresh food storage compartment and a freezer compartment. A pair of doors 12 and 13 provide access to these compartments. The doors are provided with handle mechanisms 14 and 15 for opening and closing the doors. In the illustrated refrigerator the handle mechanisms extend vertically along the doors. More specifically, as illustrated by mechanism 15, each mechanism includes a handle assembly 16, an upper trim strip 18 and a lower trim strip 20. The handle assembly 16 is connected to the trim strips 18 and 20 and all three are connected to the door by screws 22. In addition, the upper and lower ends of the trim strips 18 and 20 respectively also are secured to the doors by suitable means not shown. A pair of decorative caps 24 snap over the junction between the handle assembly and the trim strips and cover the screw attachments, Referring now to FIGS. 2 and 3, the handle assembly 16 includes an elongated stiffener member 26 formed as an elongated channel having a base 28 and projecting sides 30, 32. A number of apertures 34 are provided in the base portion 28. At each end the channel bends toward the refrigerator as at 38 and is formed with a mounting foot or pad 40 with an elongated slot 42 to receive one of the screws 22. The distal end of each pad is formed with an offset portion in the shape of a pair of raised tangs 44.

The handle assembly 16 also includes a body of thermoplastic elastomer with a Shore A Durometer hardness of no more than about 50 and preferably in the range of no more than 35. The elastomer 46 is injection molded around the stiffener member 16 and substantially encapsulates the member. In this regard the elastomer extends through the apertures 34. The underside of the pads 40, as seen in FIG. 2, are not covered by elastomer so that a good fit will be obtained between the pads and the front of the door. However the elastomer surrounds the offset portions 44. This provides a secure interlock between the stiffener member 26 and the body 46 of elastomer. It has been found that such an interlock is needed as the elastomer material otherwise would shrink and pull away from the stiffener, particularly at the ends. The end portions of the body 46 are formed at 48 to complement the interior shape of the decorative caps 24 to assure a close fit.

It will be noted from FIGS. 2 and 3 that the underside of the handle assembly is significantly thinner than the top. Even so the thermoplastic elastomer provides that portion of the handle assembly with the desired "soft" feel.

A preferred elastomer material is sold by Shell Chemical Company as Kraton G. Thermoplastic elastomers with Shore A Durometer hardness of less than about 50 and preferably in the range of about 35 are preferred; however, other elastomeric materials may provide the desired "soft" feel, provided they have comparable Shore A Durometer hardness characteristics. Such materials include plasticized polyvinylchloride in either solid or cellular form, and thermoset elastomeric materials such as natural or synthetic rubber in either solid or cellular form.

The stiffener member preferably is made of a suitable metal such as steel to provide the required stiffness with minimal size. However, some stiff and strong plastic materials may be used for the stiffener member. Such materials currently have the disadvantages of larger cross-sectional size and increased cost.

The thermoplastic elastomer material will not stick to the steel and the apertures 34 enable the elastomer to interlock with or firmly capture the stiffener at various locations along the handle so that the stiffener and elastomer will be a dimensionally stable assembly. Other means such as tabs or other abrupt projections extending into the elastomer from the stiffener also would provide the needed mechanical interlocking. However, such projections are expensive to provide, while the apertures 34 are formed in a simple punching operation. Those skilled in the art will recognize that a primer in the form of an adhesion enhancer could be used to provide a chemical interlock instead of the mechanical interlock previously described. Currently such adhesion enhancers are prohibitively expensive for such an application.

What is claimed is:

1. A handle for operating a refrigerator door comprising:

an elongated stiffener member in the shape of an elongated open channel with a base and projecting sides, said channel including apertures spaced along its length;

said stiffener member including a pair of spaced apart pads adjacent its ends for engagement with the refrigerator door and a pair of tangs raised from said pads;

a body elastomeric material with a Shore A Durometer between about 20 and about 50 injection molded around said member; and said body of elastomeric material extending through said apertures and surrounding said raised tangs to mechanically interlock said body of elastomeric material to said stiffener member while leaving the door side of said pads free of elastomeric material.

2. A handle as set forth in claim 1, wherein: the degree of hardness of said body is in the range of a Shore A Durometer of about 35.

3. A handle as set forth in claim 1, wherein: said elastomeric material is a plasticized polyvinylchloride.

4. A handle as set forth in claim 1, wherein: said elastomeric material is a thermoplastic elastomer.

* * * * *